3,488,068
GARDEN HOSE AND NOZZLE SUPPORT STAND
George De Voe, 427 S. Fairfax Drive,
Fort Myers, Fla. 33905
Filed Nov. 4, 1968, Ser. No. 773,032
Int. Cl. F16l 3/00
U.S. Cl. 285—61                         6 Claims

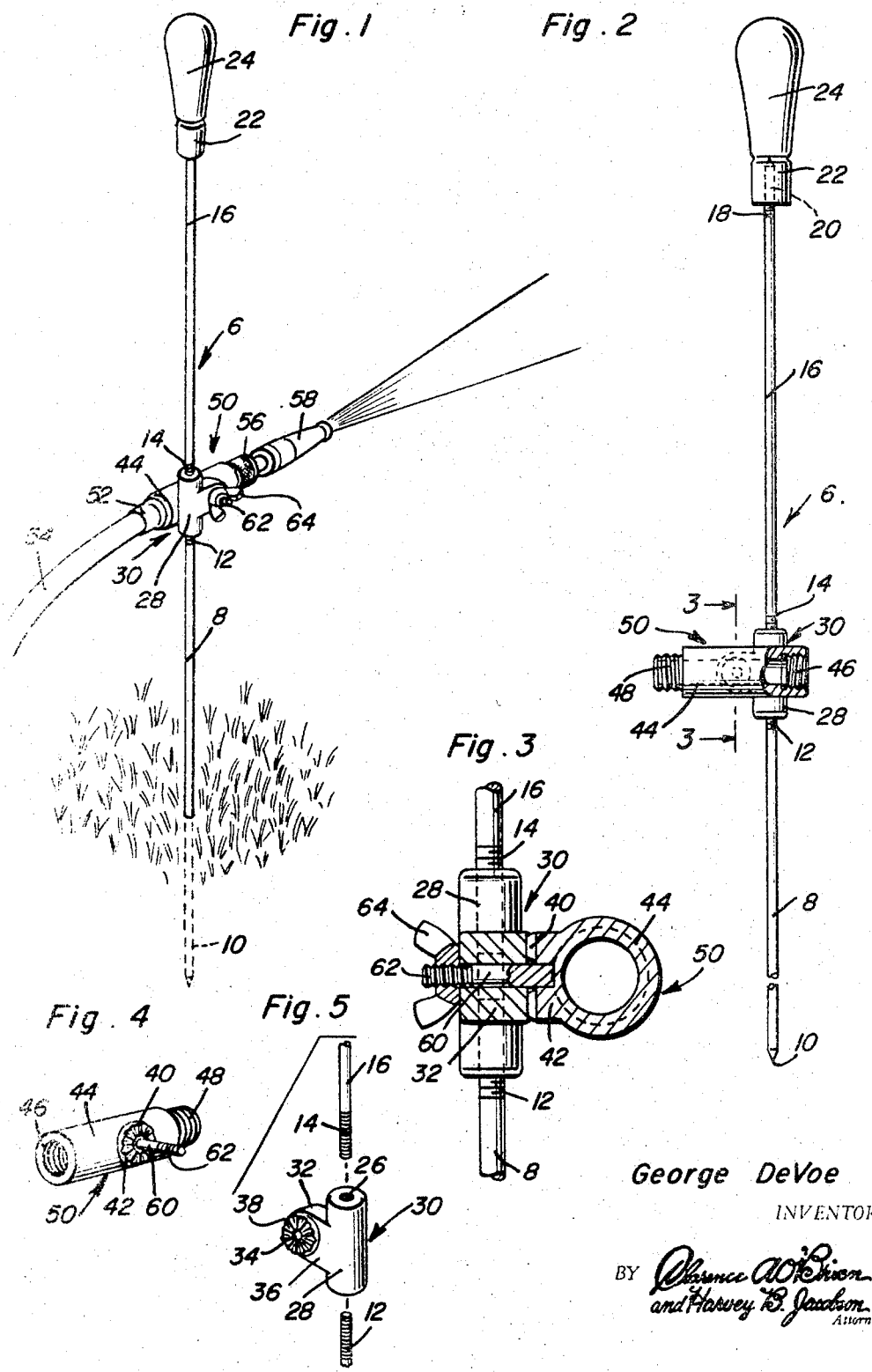

ABSTRACT OF THE DISCLOSURE

A sectional knockdown hose and nozzle stand is equipped on a median portion with a self-contained means which provides a mounting for complemental means which functions as a holder and coupling for coacting ends of a garden hose and nozzle, respectively. The nozzle can be angled and aimed to direct the stream of water at will. The first named means comprises a sleeve and the second named means also comprises a sleeve. These two sleeves are separably and adjustably connected.

---

This invention relates to a stand characterized by a standard having a pointed lower end which can be forcibly pressed and anchored in the ground, and wherein a specially constructed sleeve on said standard provides a mounting for a second sleeve, the latter sleeve being separably but tiltably fastened on the first named sleeve and being so constructed that it provides a novel holder and coupling for the coacting ends of a garden hose and an accompanying spray nozzle.

Persons conversant with the art to which the invention relates are aware that it is not new to provide a vertical standard whose lower end can be anchored in the ground and whose upper end is provided with head means whereby adjacent ends of a hose and complemental nozzle can be aligned and coupled together and wherein the head means is capable of being angularly adjusted in a manner to point or aim the nozzle to provide for varying angular adjustments. If it be so desired the reader may refer, for example, to the garden hose attachment in the patent to Dinsmoor 1,249,918.

An object of the invention, generally stated, is to structurally, functionally and in other ways improve upon prior art hose and nozzle elevating and aiming stands and, in so doing, to provide an inovation which, it is believed, will comply with the manufacturing economies of manufacturers, will appeal to practical wholesalers and retailers and will better serve the needs of users of stands in the category under advisement.

Briefly, the invention comprises a vertically elongated stand or staff having a lower rod section with a pointed lower outward end which is designed and adapted to be forcibly anchored in the ground and also having a screw-threaded inward upper end. An upper rod section is aligned with the lower rod section and has an inward screw-threaded end and an outward upper screw-threaded end. A holder mounting sleeve is aligned with and interposed between the adjacent screw-threaded ends of the upper and lower rod sections. This sleeve is internally screw-threaded and the oriented ends of the rod sections are screwed into the bore and separably joined by said sleeve. A handgrip has an axial screw-threaded socket into which the upper screw-threaded end of the upper rod section is screwed and thus separably connected. This holder mounting sleeve serves to accommodate a hose and nozzle holder characterized by a coupling sleeve provided at its ends with means for communicatively joining adjacent cooperating ends of a garden hose and complemental spray nozzle respectively. Means is provided to separably and adjustably join the respectively cooperable median portions of the sleeves together.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a garden hose nozzle support stand constructed in accordance with the principles of the invention and showing how it is set up and used.

FIG. 2 is a view in side elevation on a slightly enlarged scale and observing the structure of FIG. 1 in a direction from left to right and wherein the hose and nozzle are removed and a portion of the holder is broken away and shown in section.

FIG. 3 is an enlarged detail view taken approximately on the plane of the vertical section line 3—3 of FIG. 2 looking in the direction of the arrows.

FIG. 4 is a view in perspective of the garden hose and nozzle holder by itself.

And FIG. 5 is an exploded perspective view detailing the mounting for the holder and showing the screw-threaded ends which are connectible to the screw-threaded bore.

Referring now to the views of the drawing the sectional knockdown compact and convenient staff or standard is denoted, generally construed, by the numeral 6. It comprises a straight rigid lower rod section 8 which has an outward or lower pointed end 10 which is capable of being forcibly anchored in the ground in the manner shown in FIG. 1. The upper or inward end of this rod section is screw-threaded as at 12. It cooperates with a lower or inward screw-threaded end 14 on the upper companion rod section 16. The outward upper end of this rod section is screw-threaded as at 18 and is screwed into a socket 20 provided therefor in the ferrule portion 22 of a wooden or an equivalent handgrip 24. The screw-threaded end portions 12 and 14 are screwed into the ends of a screw-threaded axial bore 26 provided in the sleeve type mounting 28. This mounting also serves as a connector for the screw-threaded end portions 14 and 12 in the manner shown in FIG. 5. This over-all mounting is designated by the numeral 30. On one side the sleeve is provided with an outstanding integral ear-like lug 32 which has an aperture 34 which provides a bearing. The surface portion 36 is provided with a serrated embossment which is disk-like and provides what is sometimes referred to in the trade as a rosette-type connector 38. The gear-like teeth on this connector are alignable with corresponding teeth 40 on a similar boss or embossment 42 which is formed on the median portion of the sleeve 44. This sleeve 44 provides a holder and the female intake end is denoted at 46 and the projecting screw-threaded outlet or male fitting or end is denoted at 48. This over-all unit is designated as a holder 50. Manifestly it serves to mount and communicate the discharge end portion 52 of the hose 54 and the swivel connector 56 of the spray nozzle 58.

A consideration of the views singly and collectively will show how these companion features cooperate. It will also be evident that the sleeve 44 is provided on the boss side with an integral outstanding stud 60 which is journaled in the bearing 34 and has a projecting screw-threaded end portion 62 to accommodate the assembling thumb nut 64 in the manner shown in FIG. 3 in particular.

The manner in which the stand sections are constructed and assembled and are capable of compact and convenient use when stored, packaged or shipped will be clear (not shown) from the description and drawings. The manner in which the units 30 and 50 are interconnected and cooperatively associated will be clear from FIGS. 1 to 3 in particular. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A garden hose and nozzle elevating and aiming stand comprising, in combination, a vertically elongated stand embodying a lower rod section having a pointed lower outward end capable of being forcibly inserted and removably anchored in the ground and a screw-threaded inward upper end, an upper rod section alignable with said lower rod section and having an inward screw-threaded end and an outward upper screw-threaded end, a holder mounting sleeve having an open end internally screw-threaded bore, said sleeve being aligned with said rod sections and said inward ends being screwed into said bore and separably joined by said sleeve, a handgrip having an axial screw-threaded socket into which said upper screw-threaded end is screwed and separably connected, a hose and nozzle holder embodying a coupling sleeve provided at its respective ends with means for communicatively joining adjacent cooperating ends of a garden hose and complemental spray nozzle, and means separably and adjustably joining the respectively cooperable median portions of said sleeves together.

2. The stand defined in and according to claim 1, and wherein said last named means comprises (1) an ear-like adapter lug fixed on the median portion of said first-named sleeve, said lug having an aperture providing a bearing and (2) a stud fixed on the median portion of the second-named sleeve, projecting laterally therefrom and providing a journal, said stud being operatively journaled in said bearing, said stud having a free terminal screw-threaded end, and an assembling and clamping nut screwed on said screw-threaded end and clampingly engaging an adjacent cooperating face of said lug.

3. The stand defined in and according to claim 2, and wherein said lug is provided with a serrated rosette-type embossment which is opposed to and cooperable with a companion serrated rosette-type embossment integral and aligned with said stud, the cooperable serrations defining interengaging gear-like teeth.

4. A garden hose and nozzle elevating and supporting stand comprising, in combination, a vertically elongated staff having a pointed lower end and an upper end provided with a hand-grip, a hose and nozzle holder embodying a coupling, said coupling comprising a first sleeve having an intake end internally screw-threaded to facilitate joining a male fitting on the delivery end of a garden hose thereto and having an outlet end provided with a reduced externally screw-threaded neck providing a male fitting for a hose nozzle which is adapted to cooperate with said hose, holder mounting means carried by a median portion of said staff, said holder mounting means comprising a second sleeve complemental to said first sleeve, said second sleeve having an axial open-ended internally screw-threaded bore, said staff embodying an upper rod section and a companion lower rod section, the respective adjacent ends of said rod sections being screw-threaded and removably screwed into coacting end portions of said screw-threaded bore, and means separably and adjustably joining the respective median portions of said sleeves to each other.

5. The elevating and supporting stand defined in and acording to claim 4, and wherein said last named means comprises an apertured ear-liked adapter lug fixed on said second sleeve, a stud fixed on and projecting laterally from the first named sleeve, the aperture in said lug providing a bearing and said stud providing a journal and passing through and being journaled for rotation in said bearing, said stud having a free screw-threaded end, and an assembling and clamping wing-nut screwed on said screw-threaded end in a position to clampingly and adjustably engage and bind against said lug.

6. The elevating and supporting stand defined in and according to claim 5, and wherein confronting surface portions of said first and second sleeves are provided with axially aligned serrated rosette-type embossments, the serrations providing radial gear-like teeth which coact in interlocking retentive association with each other.

References Cited

UNITED STATES PATENTS

| | | | |
|---|---|---|---|
| 180,007 | 7/1876 | Copping | 239—276 X |
| 631,317 | 8/1899 | Miller | 248—87 |
| 1,249,918 | 12/1917 | Dinsmoor | 285—61 X |
| 1,323,535 | 12/1919 | Kreer | 248—88 |
| 1,743,537 | 1/1930 | Freese | 248—87 |
| 2,631,062 | 3/1953 | Tiedemann et al. | 285—61 X |
| 2,706,653 | 4/1955 | Blakely | 248—87 X |

DAVID J. WILLIAMOWSKY, Primary Examiner

DAVE W. AROLA, Assistant Examiner

U.S. Cl. X.R.

248—88; 285—184